United States Patent
Liu

(10) Patent No.: US 10,925,326 B2
(45) Date of Patent: Feb. 23, 2021

(54) BREAST CUP FOR UNDERWEAR AND METHOD FOR MANUFACTURING THE SAME

(71) Applicant: Regina Miracle International (Group) Limited, Kwai Chung (HK)

(72) Inventor: Zhenqiang Liu, Kwai Chung (HK)

(73) Assignee: Regina Miracle International (Group) Limited, Kwai Chung (HK)

( * ) Notice: Subject to any disclaimer, the term of this patent is extended or adjusted under 35 U.S.C. 154(b) by 32 days.

(21) Appl. No.: 16/024,337

(22) Filed: Jun. 29, 2018

(65) Prior Publication Data

US 2019/0000154 A1   Jan. 3, 2019

(30) Foreign Application Priority Data

Jun. 30, 2017   (CN) .......................... 201710523535.0

(51) Int. Cl.
*A41C 3/12* (2006.01)
*A41C 3/00* (2006.01)
(Continued)

(52) U.S. Cl.
CPC .............. *A41C 3/12* (2013.01); *A41C 3/0057* (2013.01); *A41C 5/005* (2013.01); *B29C 43/021* (2013.01); *B29C 69/02* (2013.01); *B32B 1/00* (2013.01); *B32B 3/266* (2013.01); *B32B 3/30* (2013.01); *B32B 5/02* (2013.01); *B32B 5/18* (2013.01); *B32B 27/065* (2013.01); *B32B 27/12* (2013.01);
(Continued)

(58) Field of Classification Search
CPC .............. A41C 3/144; A41C 3/14; A41C 3/12

USPC .......................................................... 450/37
See application file for complete search history.

(56) References Cited

U.S. PATENT DOCUMENTS 2,524,028 A * 10/1950 Bordner .................... A61F 2/52
                                                                623/7
5,522,892 A *  6/1996 Lin ......................... A41C 3/144
                                                               450/39
(Continued)

FOREIGN PATENT DOCUMENTS

CN          1317278 A       10/2001
CN          2562599 Y        7/2003

OTHER PUBLICATIONS

Office Action issued in Chinese Patent Application No. 201710523535.0 dated Dec. 16, 2019.
(Continued)

*Primary Examiner* — Timothy K Trieu
(74) *Attorney, Agent, or Firm* — Kaplan Breyer Schwarz, LLP

(57) ABSTRACT

A breast cup for an undergarment, such as a brassiere, includes a cup core that has a first surface and a second surface opposite the first surface. Each of the first and second surfaces is formed with a plurality of grooves. Each groove has an elongated opening, an elongated bottom, and a sidewall on each of two longitudinal sides of the groove. The breast cup also includes a first fabric layer overlying the first surface of the cup core, and a second fabric layer overlying the second surface of the cup core. A top part of the sidewalls of one or more of the plurality of the first grooves is attached to the first fabric layer while at least a portion of the bottom of the one or more of the plurality of the first grooves is not attached to the first fabric layer.

10 Claims, 6 Drawing Sheets

(51) Int. Cl.
| | |
|---|---|
| *B32B 1/00* | (2006.01) |
| *B32B 3/30* | (2006.01) |
| *B32B 3/26* | (2006.01) |
| *B32B 5/02* | (2006.01) |
| *B32B 27/12* | (2006.01) |
| *B32B 27/40* | (2006.01) |
| *B32B 5/18* | (2006.01) |
| *B32B 27/06* | (2006.01) |
| *B29C 69/02* | (2006.01) |
| *A41C 5/00* | (2006.01) |
| *B29C 43/02* | (2006.01) |
| *B29C 43/20* | (2006.01) |
| *B29C 45/26* | (2006.01) |
| *B29K 75/00* | (2006.01) |
| *B29K 105/04* | (2006.01) |
| *B29L 31/48* | (2006.01) |
| *B29L 9/00* | (2006.01) |
| *B29C 43/18* | (2006.01) |
| *B29C 69/00* | (2006.01) |

(52) U.S. Cl.
CPC ............. *B32B 27/40* (2013.01); *B29C 43/18* (2013.01); *B29C 43/184* (2013.01); *B29C 43/206* (2013.01); *B29C 45/2628* (2013.01); *B29C 69/00* (2013.01); *B29C 2043/023* (2013.01); *B29K 2075/00* (2013.01); *B29K 2105/04* (2013.01); *B29L 2009/00* (2013.01); *B29L 2031/4885* (2013.01); *B32B 2266/0278* (2013.01); *B32B 2437/00* (2013.01)

(56) References Cited

U.S. PATENT DOCUMENTS

| | | | | |
|---|---|---|---|---|
| 6,080,037 | A * | 6/2000 | Lee | A41C 3/105 2/67 |
| 6,921,316 | B1 * | 7/2005 | Jian | A41C 3/105 450/38 |
| 8,628,507 | B1 * | 1/2014 | Carroll | A61F 13/141 604/346 |
| 10,448,679 | B1 * | 10/2019 | Roddis | A41C 3/12 |
| 2006/0166601 | A1 * | 7/2006 | Chen | A41C 3/144 450/57 |
| 2017/0172220 | A1 * | 6/2017 | Sung | A41C 3/0085 |

OTHER PUBLICATIONS

Office Action issued in Chinese Patent Application No. 201710523535.0 dated Aug. 10, 2020.

\* cited by examiner

US 10,925,326 B2

BREAST CUP FOR UNDERWEAR AND METHOD FOR MANUFACTURING THE SAME

CROSS-REFERENCE TO RELATED APPLICATIONS

This application claims foreign priority to and the benefit of Chinese Patent Application No. 201710523535.0, filed on 30 Jun. 2017, the entire disclosure of which is incorporated herein by reference.

FIELD OF THE INVENTION

This invention relates to a breast cup for an undergarment such as a brassiere, and a method for manufacturing such a breast cup.

BACKGROUND OF THE INVENTION

A breast cup for underwear usually comprises a breast cup core and fabric layers covering both sides of the breast cup core. Normal underwear usually fits closely with the wearer's body to achieve a good visual effect. However, especially during hot weather or exercise, the underwear's close fit with the body can make it difficult to dissipate heat, causing discomfort to the wearer.

SUMMARY OF THE INVENTION

This application is directed to proposing a breast cup and its method of manufacture to overcome the above-mentioned problems.

According to one aspect of the present invention, an undergarment breast cup is provided. The breast cup comprises a cup core that has a first surface and a second surface opposite the first surface. Each of the first and second surfaces is formed with a plurality of grooves, each groove having an elongated opening, an elongated bottom, and a sidewall on each of two longitudinal sides of the groove. A first fabric layer overlies or covers the first surface of the cup core, and a second fabric layer overlies or covers the second surface of the cup core. A top part of the sidewalls of one or more of the plurality of the first grooves is attached to the first fabric layer while at least a portion of the bottom of the one or more of the plurality of the first grooves is not attached to the first fabric layer.

According to another aspect of the present invention, there is provided a method for manufacturing a undergarment breast cup. The method comprises forming a breast cup core with a mold, preferably by injection molding. The breast cup core so formed comprises a cup core that has a first surface and a second surface opposite the first surface. Each of the first and second surfaces is formed with a plurality of grooves, each groove having an elongated opening, an elongated bottom, and a sidewall on each of two longitudinal sides of the groove. A first fabric layer overlies or covers the first surface of the cup core, and a second fabric layer overlies or covers the second surface of the cup core. A top part of the sidewalls of one or more of the plurality of the first grooves is attached to the first fabric layer while at least a portion of the bottom of the one or more of the plurality of the first grooves is not attached to the first fabric layer.

DETAILED DESCRIPTION OF THE INVENTION

The inventions of the present application are described below with reference to the accompanying drawings in conjunction with exemplary embodiments.

In the following description, an embodiment of a method for manufacturing a breast cup for a brassiere and a brassiere obtained thereby is described, using a brassiere as an example. However, it should be appreciated that the inventions of the present application are not limited to breast cups for brassieres but may also be applied to breast cups for other clothing or underwear that includes breast cups.

It should be understood that in this description, the inner and outer sides are defined with respect to the wearer's body. Thus, the inner side is the side that is closer to the wearer's body when the clothing is worn, and the outer side is the side that is further away from the wearer's body when the clothing is worn.

Figure 6:
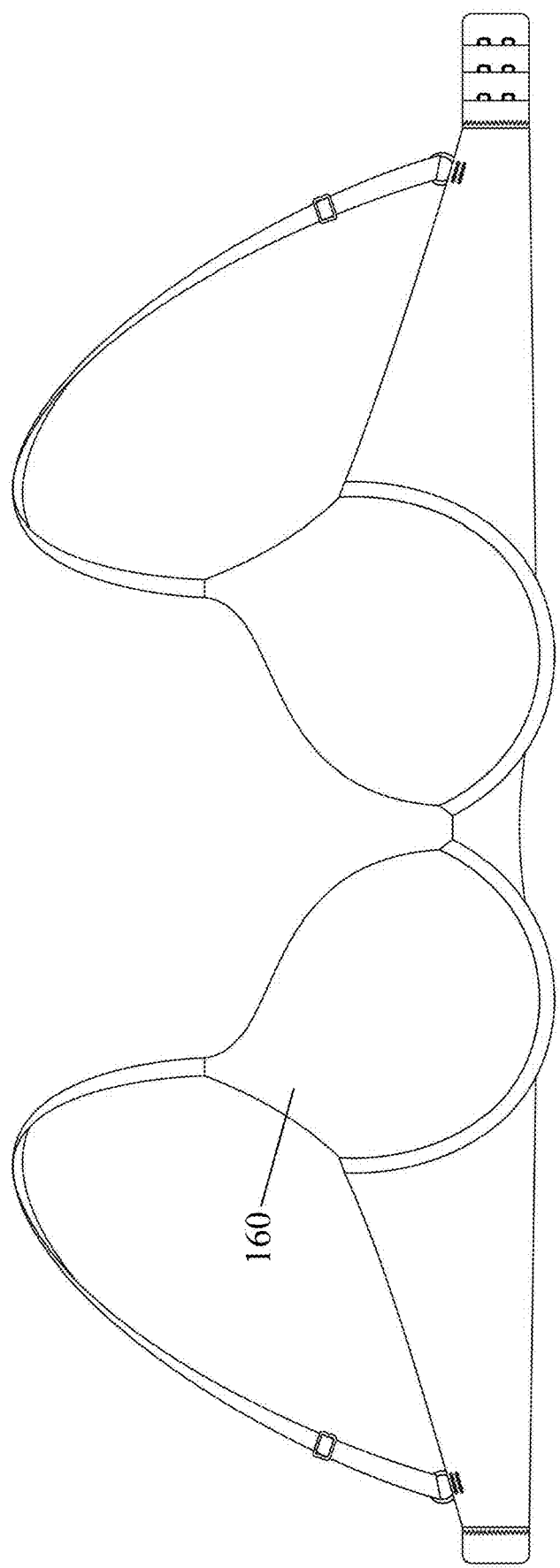
FIG. 6 shows a schematic view of a brassiere formed according to an exemplary embodiment of the present invention.

Referring to FIG. 6, a brassiere usually includes two breast cups connected through a connector or center gore, as well as shoulder straps and side wings attached to the breast cups. The breast cup of an embodiment of the present invention includes a breast cup core, an inner layer attached to the inner side of the breast cup core, and an outer layer attached to the outer side of the breast cup core. The breast cup core is typically formed from a polyurethane foam or any other suitable moldable material. It is preferably injection-molded. The shape of the breast cup is substantially defined by the breast cup core.

Figure 1:
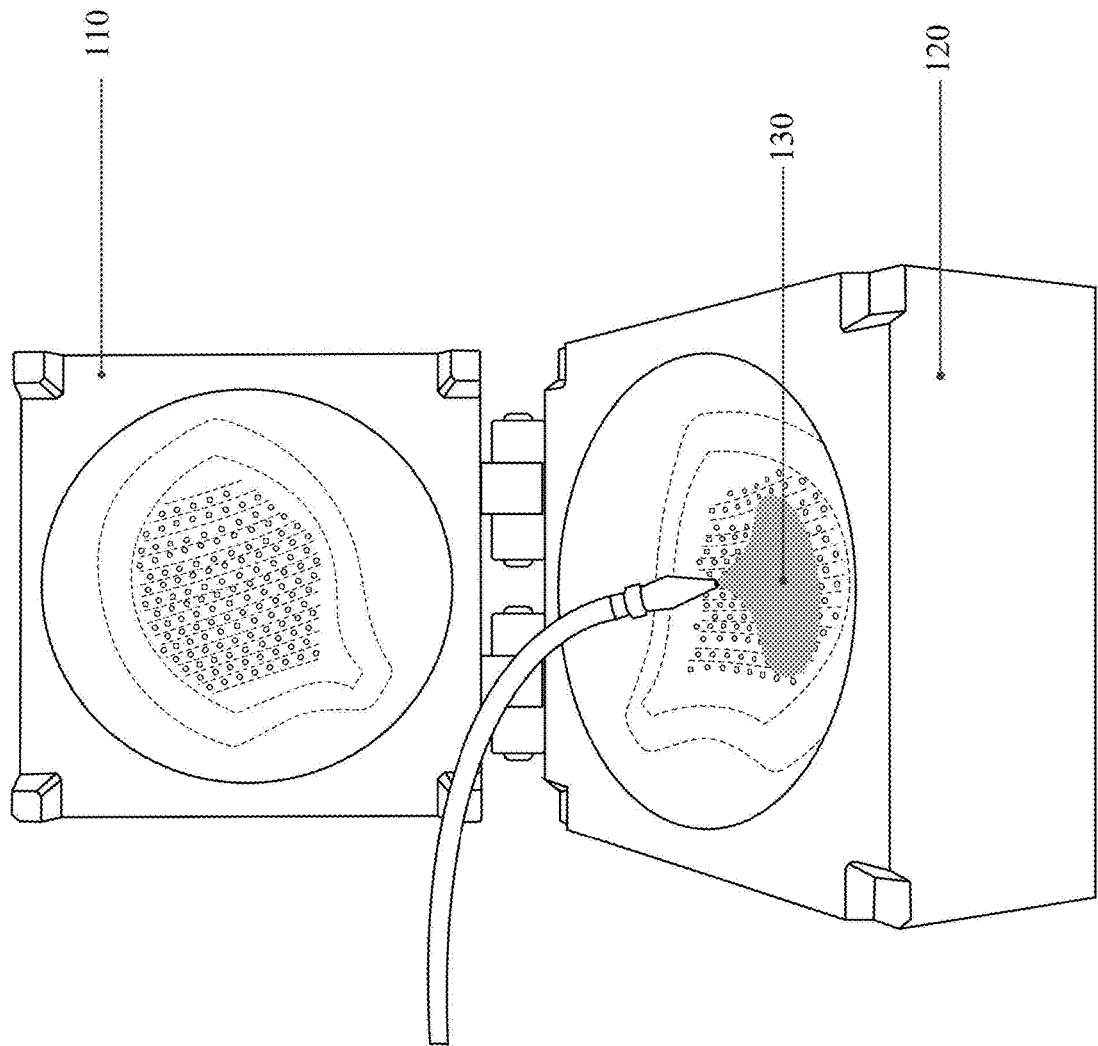
FIGS. 1 and 2 show schematic views of an apparatus and a method for forming a breast cup core according to an exemplary embodiment of the present invention.
Figure 2:
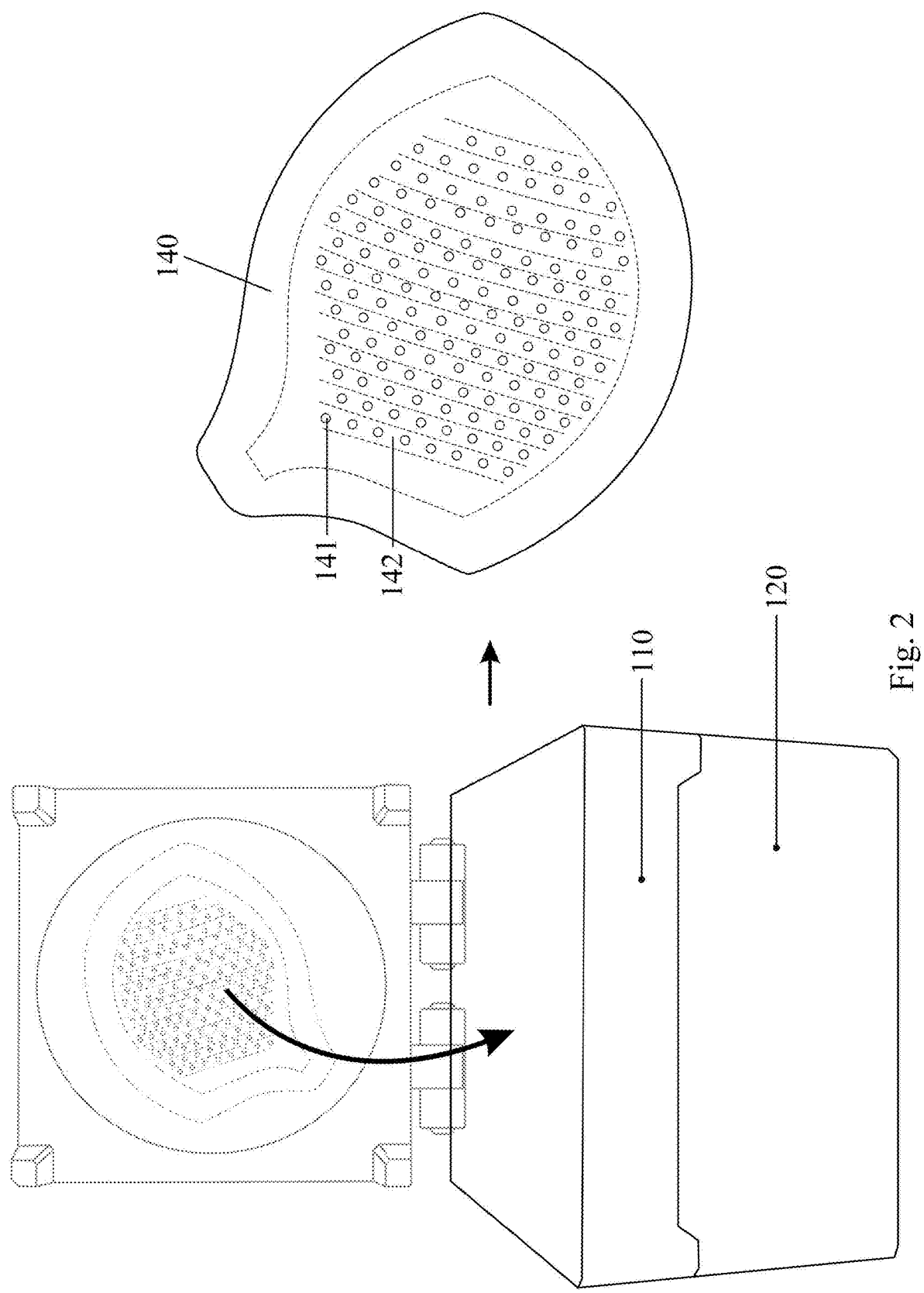

FIGS. 1 and 2 show the schematic views of an apparatus and a method for forming a breast cup core according to an exemplary embodiment of the present invention. As shown, a mold comprising an upper or convex mold portion 110 and a lower or concave mold portion 120 may be used. The convex mold portion 110 and the concave mold portion 120, when closed towards each other, define a shape or a cavity corresponding to a desired shape for the breast cup core. Liquid foam material 130 is injected into the space or cavity formed in the concave mold portion 120 through an injection head. After a desired amount of the foam material 130 is injected, the convex mold portion 110 and the concave mold portion 120 are closed and the injected foam material 130 is injection-molded into the breast cup core 140 having the desired shape. The mold portions 110 and 120 are designed such that, upon molding, the molded breast cup core 140 comprises, on one or both of its inner and outer surfaces, a plurality of groove-shaped recesses or troughs 142, as well as a plurality of holes or apertures 141 in the recesses 142.

Figure 3A:
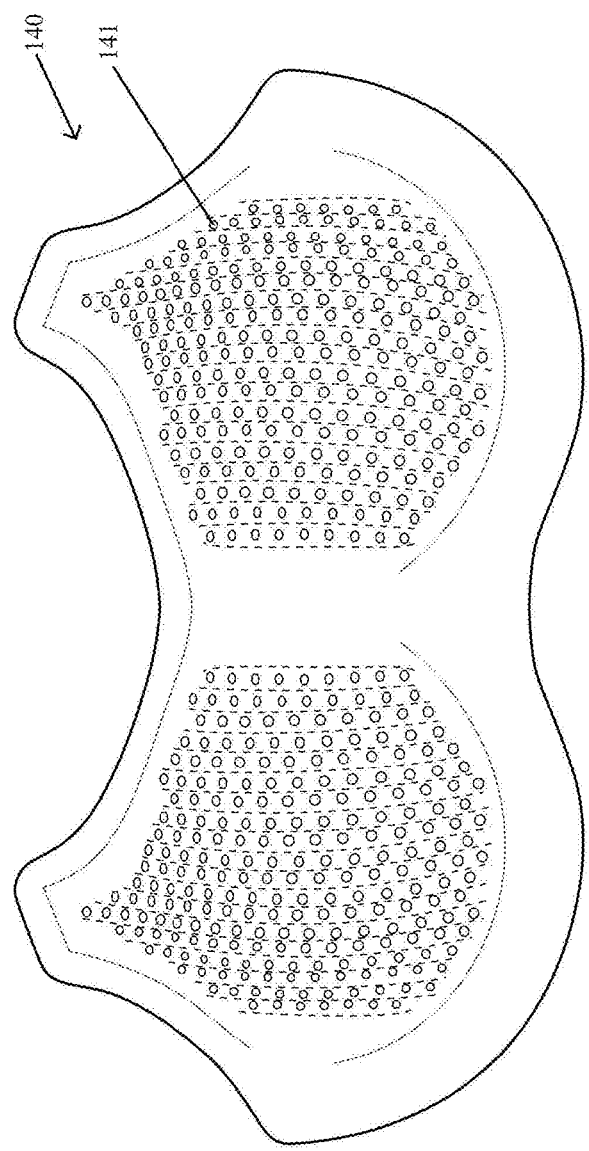
FIGS. 3A and 3B respectively show a front view and a side view of a breast cup core formed by the apparatus and method shown in FIGS. 1 and 2, according to an exemplary embodiment of the present invention.
Figure 3B:
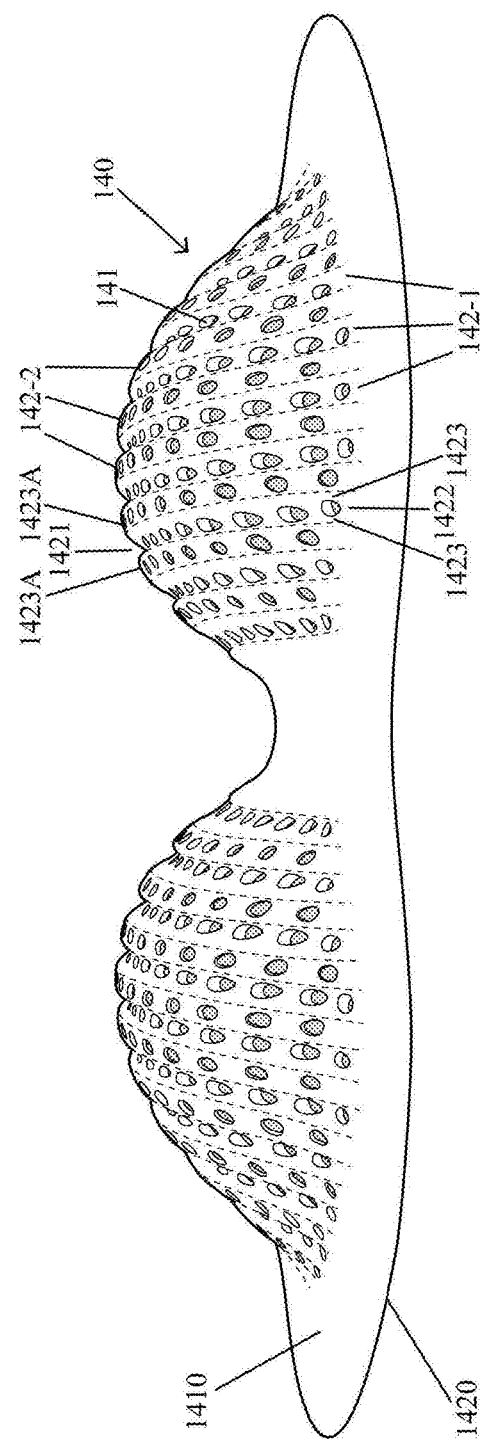

FIG. 3A and FIG. 3B show a front view and a side view respectively of a breast cup core formed by the apparatus and method shown in FIGS. 1 and 2, according to an exemplary embodiment of the present invention. It should be appreciated that while FIG. 3A and FIG. 3B show a cup core that includes both a left cup portion and a right cup portion, a breast cup core of the present invention may include a single cup portion or two cup portions. In the embodiment as shown in FIG. 3B, a plurality of grooves or groove-shaped recesses 142-1 are formed on the outer surface 1410 of the breast cup core 140, and a plurality of grooves or groove-shaped recesses 142-2 are also formed on the inner surface 1420 of the core 140. The grooves 142-1 on the outer surface 1410 and the grooves 142-2 on the inner surface 1420 are alternately formed so that a groove or recess 142-2 on the inner surface 1420 also appears as a protrusion on the outer surface 1410, and vice versa. The side view shown in FIG. 3B shows the outer surface 1410 of the breast cup core 140 and the plurality of groove-shaped recesses 142-1 on the outer surface 1410, and also shows the plurality of groove-shaped recesses 142-2 formed on the inner surface 1420 appearing as protrusions on the outer surface 1410. Taking the grooves 142-1 on the outer surface 1410 as an example, and appreciating that the same applies to the grooves 142-2 on the inner surface 1420, each groove 142-1 comprises an elongated opening 1421, a elongated bottom or channel 1422 corresponding to the elongated opening, and a sidewall 1423 on each of the two longitudinal sides of the groove, extending upwardly from the elongated bottom. A sidewall 1423 extends upward or raises from the bottom 1422 and has a top part or crest 1423A. At least at the bottom 1422 of the groove 142-1 and/or the groove 142-2, a plurality of holes or apertures 141 may be formed. An aperture 141 may be formed as a through hole. For each of the grooves 142-1 and 142-2, the size of an aperture 141 is smaller than the size of the elongated opening 1421 of the groove 142-1 or 142-2. The grooves 142-1, 142-2 and the apertures 141 enable air circulation through them. With such a structure of the breast cup core 140, the air circulation effect in the breast cup is enhanced. It should be appreciated that the grooves alone without the apertures 141 can also enhance air circulation, and hence the apertures 141 are optional. However, the presence of the apertures 141 in the grooves can further improve the air circulation effect and is preferred.

In the exemplary embodiment as illustrated in FIG. 3A and FIG. 3B, the plurality of grooves 142-1 on the outer surface 1410 and the plurality of grooves 142-2 on the inner surface 1420 respectively of the breast cup core 140 are substantially straight grooves running substantially parallel to each other. The grooves generally run from the neckline and/or the sideline of a breast cup to the bottom of the breast cup, orientated such that they run in a vertical direction when the clothing or underwear is worn. Alternatively, the grooves may be orientated such that they run in a horizontal direction when the clothing or underwear is worn. The grooves may also be curved outwards, i.e. in a convex shape, towards the armpit. Alternatively, the grooves may also be curved outwards, i.e. in a convex shape, towards the center gore. FIG. 3A shows the grooves on the right cup portion slightly curved outwards towards an armpit, and the grooves on the left cup portion slightly curved outwards towards the other armpit. It is found that substantially straight or slightly curved grooves provide better ventilation than grooves that run in a wave-like manner. Preferably, each of the curved grooves has a single center of curvature, or comprises a single convex shape.

Figure 4:
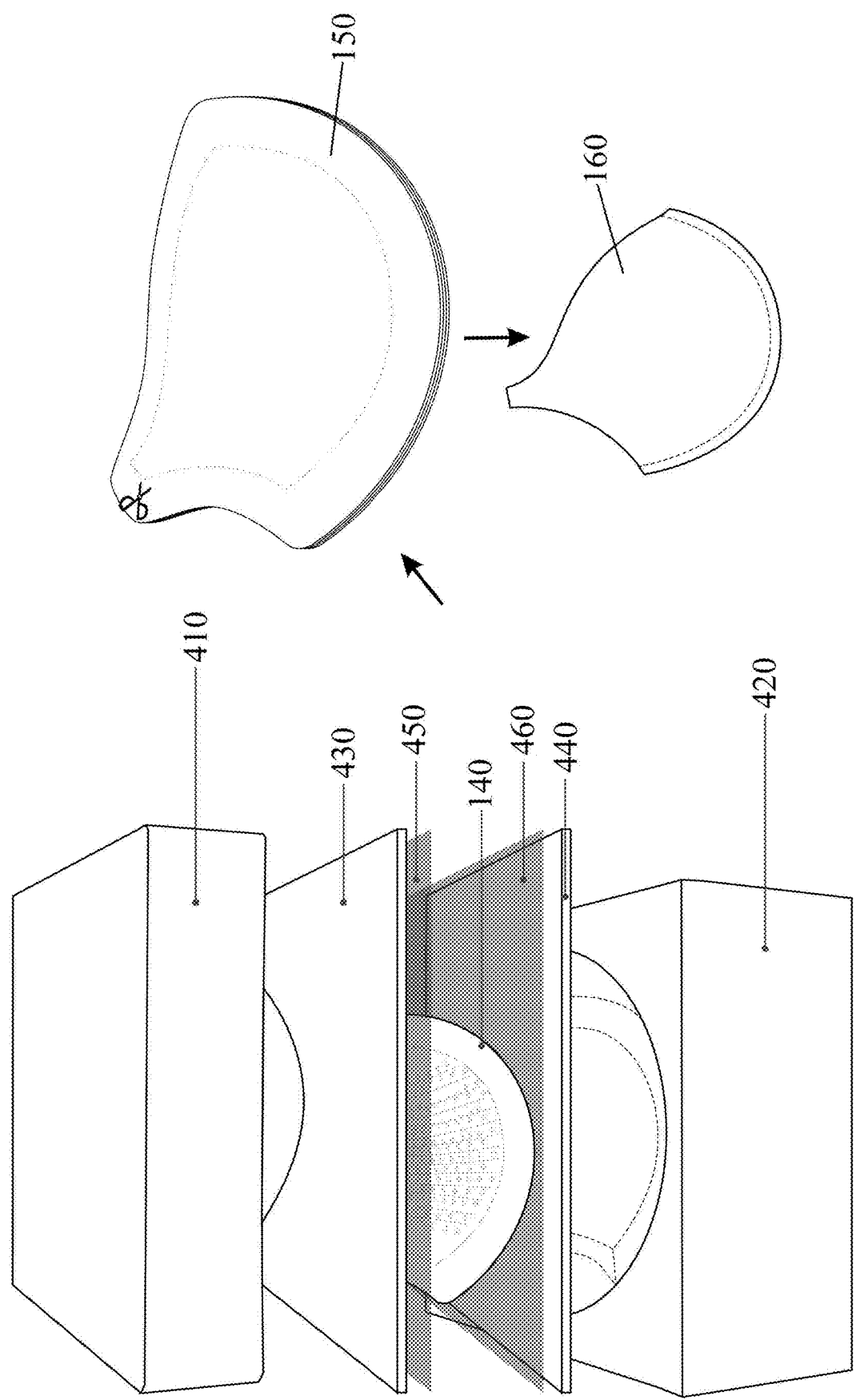
FIG. 4 shows a schematic view of forming a breast cup according to an exemplary embodiment of the present invention.

FIG. 4 shows a schematic view of the formation of a breast cup according to an exemplary embodiment of the present invention. As illustrated, the breast cup core 140, a first or an outer fabric layer 440 overlying a first or an outer surface 1410 of the breast cup core 140, and a second or an inner fabric layer 430 overlying a second or an inner surface 1420 of the breast cup core are molded together under heat and pressure between a convex mold portion 410 and a concave mold portion 420. Specifically, a first fabric layer 440 may be disposed between the breast cup core 140 and the concave mold portion 420, and a second fabric layer 430 may be disposed between the breast cup core 140 and the convex mold portion 410. An adhesive 460 may be provided between the breast cup core 140 and the first fabric layer 440, and an adhesive 450 may also be provided between the breast cup core 140 and the second fabric layer 430. Upon molding under heat and pressure, the first fabric layer 440 and the second fabric layer 430 are adhered to the outer and inner surfaces of the breast cup core 140 respectively. According to an embodiment of the present invention, the convex mold portion and the concave mold portion are designed such that, when the mold portions are closed, there is a certain distance or a gap between the surfaces of the concave mold and the convex mold that are facing each other, so that during the molding process, the breast cup core is pressed but the first and second fabric layers are not pressed against each other. The result is that after molding, there is a certain distance or a gap remaining between the fabric layer—whether it is the first or the second fabric layer—and the bottom of the grooves that are facing the fabric layer. The word "facing" as used here means that the bottom of the groove is positioned further away from the fabric layer while the top of the groove is positioned closer to the fabric layer. In other words, after the molding process, although the top of a groove may be attached to the fabric layer that is facing the bottom of the groove, the bottom of the groove is not attached to the fabric layer that is facing the bottom of the groove. This applies to all or at least a plurality of the grooves, and thereby creates a plurality of air passages or air channels through the plurality of grooves, i.e. through the gaps between the first or second fabric layer and the bottom of the plurality of grooves facing the fabric layer, consequently enhancing the air ventilation effect of the breast cup so formed. This structure is apparent from the cross-sectional view of FIG. 5. In order to further ensure the formation of the air channels between the fabric layer and the bottom of the grooves facing the fabric layer, preferably only the top of the groove sidewalls may be provided with adhesive, and the bottom of the grooves is not provided with any adhesive. In order to ensure this selective application of adhesives, adhesives may for example be applied manually or by spraying.

FIG. 4 also shows, respectively, the precursor breast cup 150 obtained after heat press molding, with fabric layers 440, 430 attached respectively to the outer and inner surfaces of the breast cup core 140, as well as the final breast cup 160 obtained after trimming.

Figure 5:
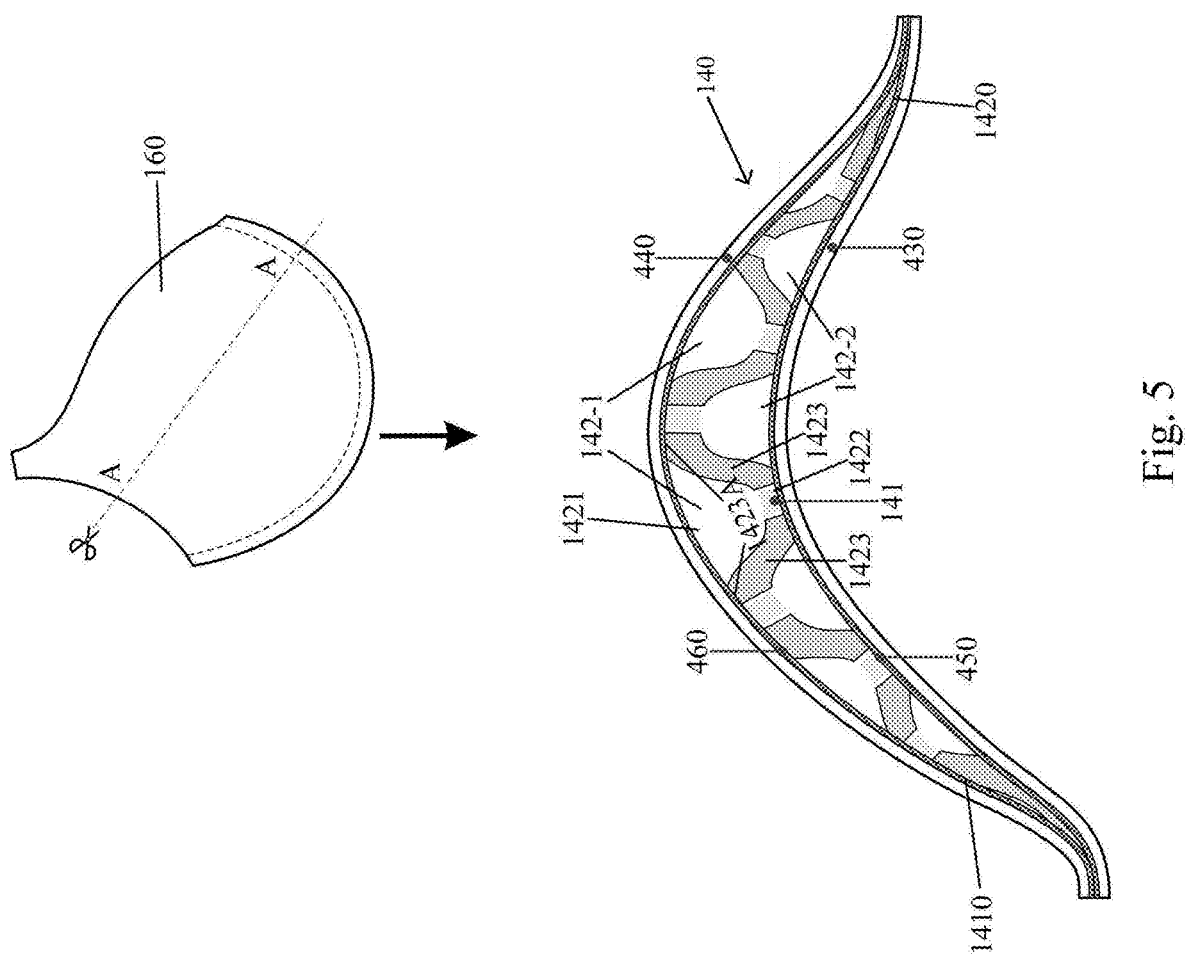
FIG. 5 shows a cross-sectional view of a breast cup formed according to an exemplary embodiment of the present invention.

FIG. 5 shows a cross-sectional view taken along line A-A of a breast cup 160 according to an exemplary embodiment of the present invention. As shown in FIG. 5, a first fabric layer 440 is attached to the outer surface 1410 of the breast cup core 140 in such a way that at least a portion of the top part 1423A of the raised sidewall 1423 of each of a plurality of first grooves 142-1 is attached to the first fabric layer 440, while the bottom 1422 of each of such first grooves 142-1 or at least a portion of the bottom 1422 of each of such first grooves 142-1 is not attached to the first fabric layer 440, so that the gap between the first fabric layer 440 and the bottom 1422 of such first grooves 142-1 of the breast cup core 140 form air channels which could enhance ventilation.

Similarly, a second fabric layer 430 may also be attached to the inner surface 1420 of the breast cup core 140 such that at least a portion of the top part 1423A of the raised sidewall 1423 of each of a plurality of second grooves 142-2 is attached to the second fabric layer 430, while the bottom 1422 or at least a portion of the bottom 1422 of each of such second grooves 142-2 is not attached to the second fabric layer 430, so that the gap between the second fabric layer 430 and the bottom 1422 of such second grooves 142-2 of the breast cup core 140 form air channels which could enhance ventilation.

It should be understood that while in the foregoing description, the first fabric layer refers to the outer fabric layer and the second fabric layer refers to the inner fabric layer, they may instead refer to the inner fabric layer and the outer fabric layer respectively. In addition, either or both of the first and second fabric layers may be attached to the breast cup core in the manner as described in the foregoing, i.e. with air channels formed between the first and/or second fabric layers and the bottom of the grooves facing the fabric layer.

FIG. 6 shows a schematic diagram of a brassiere that includes a breast cup 160 formed according to the present invention.

According to an embodiment of the breast cup of the present invention, air channels and/or ventilation holes are formed in the grooves positioned under the inner and/or the outer fabric layers, thereby facilitating a wearer's heat dissipation during exercise or hot weather.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiments were chosen and described in order to best explain the principles of the present disclosure and its practical application, to thereby enable others skilled in the art to best utilize the present disclosure and various embodiments with various modifications as are suited to the particular use contemplated.

The invention claimed is:

1. A breast cup comprising:
   a cup core that has a first surface and a second surface opposite the first surface, the cup core defining a cup-shape portion, each of the first and second surfaces being formed with a plurality of grooves extending across a contour of the cup-shape portion from one edge thereof to another edge thereof, each groove having an elongated opening, an elongated bottom, and an elongated sidewall on each of two longitudinal sides of the groove, the elongated sidewalls of each groove being unitary with one another at the elongated bottom thereof;
   a first fabric layer covering the first surface of the cup core;
   a second fabric layer covering the second surface of the cup core;
   wherein a top part of each of the elongated sidewalls of one or more of the plurality of the first grooves is attached to the first fabric layer while at least a portion of the elongated bottom of the one or more of the plurality of the first grooves is not attached to the first fabric layer.

2. The breast cup as claimed in claim 1, wherein a top part of each of the sidewalls of one or more of the plurality of the second grooves is attached to the second fabric layer while at least a portion of the bottom of the one or more of the plurality of the second grooves is not attached to the second fabric layer.

3. The breast cup as claimed in claim 1, wherein a plurality of apertures are formed in at least a portion of the bottom of the one or more of the plurality of first and second grooves.

4. The breast cup as claimed in claim 3, wherein the apertures are through holes.

5. The breast cup as claimed in claim 1, wherein the plurality of first grooves and the plurality of second grooves are substantially parallel grooves.

6. The breast cup as claimed in claim 5, wherein the plurality of first grooves and the plurality of second grooves are substantially straight grooves.

7. The breast cup as claimed in claim 5, wherein the plurality of first grooves and the plurality of second grooves are curved, and wherein each curved groove comprises a single convex shape.

8. The breast cup as claimed in claim 1, wherein the plurality of first grooves and the plurality of second grooves are alternately arranged.

9. The breast cup as claimed in claim 1, wherein the cup core is formed by injection molding.

10. A breast cup comprising:
    a cup core having a cup-shape portion, the cup-shape portion having a wavy shape defining alternating elongated first grooves and elongated first crests on a first side of said cup core and alternating elongated second grooves and elongated second crests on a second side of said cup core the first and second elongated grooves extending across a contour of the cup-shape portion from one edge thereof to another edge thereof each of the grooves having an elongated opening, an elongated bottom, and an elongated sidewall on each of two longitudinal sides of the groove, the elongated sidewalls of each groove being unitary with one another at the elongated bottom thereof:
    a first fabric layer covering a first surface of the cup core;
    a second fabric layer covering a second surface of the cup core; wherein on the first side of the cup core, only the first crests are attached to the first fabric layer.

* * * * *